(12) United States Patent
Koga et al.

(10) Patent No.: US 8,571,735 B2
(45) Date of Patent: Oct. 29, 2013

(54) WARM-UP METHOD FOR HYBRID-TYPE CONSTRUCTION MACHINE AND HYBRID-TYPE CONSTRUCTION MACHINE

(75) Inventors: Masato Koga, Kanagawa (JP); Tetsuji Ono, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 260 days.

(21) Appl. No.: 13/142,921

(22) PCT Filed: Jan. 6, 2010

(86) PCT No.: PCT/JP2010/050072
§ 371 (c)(1),
(2), (4) Date: Jun. 30, 2011

(87) PCT Pub. No.: WO2010/079794
PCT Pub. Date: Jul. 15, 2010

(65) Prior Publication Data
US 2011/0270481 A1  Nov. 3, 2011

(30) Foreign Application Priority Data
Jan. 7, 2009 (JP) .................................. 2009-001774

(51) Int. Cl.
*F02D 29/04* (2006.01)
*G06F 19/00* (2011.01)

(52) U.S. Cl.
USPC .............................................. 701/22; 701/50

(58) Field of Classification Search
USPC ................... 701/22, 50, 102; 60/286
See application file for complete search history.

(56) References Cited

U.S. PATENT DOCUMENTS

| | | | |
|---|---|---|---|
| 6,163,135 A | 12/2000 | Nakayama et al. | |
| 2002/0167296 A1* | 11/2002 | Nagata et al. | 320/155 |
| 2006/0174608 A1* | 8/2006 | Hu et al. | 60/286 |
| 2007/0265762 A1* | 11/2007 | Suzuki | 701/102 |
| 2010/0070123 A1 | 3/2010 | Itoh et al. | |
| 2010/0152938 A1* | 6/2010 | Aoki et al. | 701/22 |

FOREIGN PATENT DOCUMENTS

| | | |
|---|---|---|
| EP | 0985570 A2 | 3/2000 |
| JP | 10-103112 | 4/1998 |
| JP | 2000-092614 | 3/2000 |
| JP | 2001-012241 | 1/2001 |
| JP | 2002-242234 | 8/2002 |
| JP | 2008-049877 | 3/2008 |
| WO | WO 2008/023245 | 2/2008 |

OTHER PUBLICATIONS

Japanese Office Action mailed on Feb. 7, 2012.
International Search Report mailed on Apr. 20, 2010.
Extended European Search Report mailed Jun. 18, 2012.

* cited by examiner

*Primary Examiner* — Tan Q Nguyen
(74) *Attorney, Agent, or Firm* — IPUSA, PLLC

(57) ABSTRACT

When a hybrid-type construction machine including an electric power accumulator is started under a low-temperature environment, at first an ignition key of an engine is turned on to drive the engine. If the temperature of the electric power accumulator is lower than a predetermined temperature, the electric power accumulator is heated by driving the engine. Further, if the temperature of the electric power accumulator is lower than the predetermined temperature, the engine is driven to carry out a warm-up operation and a motor generator is driven to charging and discharge the electric power accumulator to thereby heat the electric power accumulator.

11 Claims, 10 Drawing Sheets

WARM-UP METHOD FOR HYBRID-TYPE CONSTRUCTION MACHINE AND HYBRID-TYPE CONSTRUCTION MACHINE

TECHNICAL FIELD

The present invention relates to hybrid-type construction machines, and more particularly to a hybrid-type construction machine where the driving of an engine is assisted by an electric motor.

BACKGROUND ART

Many construction machines are hydraulically driven. Examples of hydraulically driven construction machines include hydraulic shovels. Generally, in hydraulic shovels, a shovel is driven, an upper-part turning body is caused to turn, and a lower-part traveling body is caused to travel using a hydraulic actuator (hydraulic cylinders and hydraulic motors). In general, hydraulic pressure supplied to a hydraulic actuator is often generated by a hydraulic pump whose drive source is an engine. In this case, the output of the hydraulic actuator is determined by the output of the engine.

Full capacity of the engine is not always required. For example, 90% or 80% of the capacity is often sufficient for the operations of hydraulic shovels. Therefore, the operation mode of the hydraulic shovel is changed according to work loads so as to optimize engine output control for different work loads, thereby efficiently driving the engine to reduce fuel consumption.

For example, it is made possible to set different operation modes such as a "high load mode" for performing a load operation corresponding to the maximum output of the engine, a "normal load mode" for performing a normal-load operation, and a "low load mode" for performing a light-load operation. Then, iso-horsepower control is performed so as to equalize the drive torque required by the hydraulic pump to drive the hydraulic actuator with the output torque of the engine in each of the operation modes, thereby efficiently utilizing the output of the engine to improve fuel consumption.

Generally, a hydraulic shovel has an engine having a maximum output corresponding to an output in the "high load state". However, a time under the "high load state" is shorter than the "normal load state". Therefore, there is a sufficient margin in the engine output when the hydraulic shovel is driven with the "normal load state". Said differently, the hydraulic shovels generally include engines having excessive outputs for the operation under the "normal load state".

In recent years and continuing, there is a demand for reduction in the amount of fuel consumed by the engine in a hydraulically driven construction machine including the above hydraulic shovel. Simple reduction in the size of the engine would result in insufficient hydraulic output at the time of driving in the "high load mode." Therefore, so-called hybrid hydraulic shovels have been developed that include an engine, a generator driven by the engine, a battery charged by the generator, and an electric motor driven with the electric power of the battery.

PRIOR ART DOCUMENT

PATENT DOCUMENT 1: Japanese Laid-Open Patent Application No. 10-103112

DISCLOSURE OF THE INVENTION

Problems to be Solved by the Invention

In a conventional hybrid-type construction machine, an operation carried out by the hybrid-type construction machine is mainly performed out of doors, and the hybrid-type construction machine is driven under various working environments. For example, when a hybrid-type construction machine is driven in cold climates, a warm-up operation is carried out until the engine is warmed up because the engine is cold at a time of starting the engine.

The hybrid-type construction machine may acquire power for operations (i.e., power for driving hydraulic pump) not only from the engine but also from an assist motor (e.g., a motor or a motor generator). The assist motor may be driven by power from an electric power accumulator such as a battery. Under a low temperature environment requiring warm-up of the engine, an internal resistance of the electric power accumulator is increased and sufficient power is not obtainable from the electric power accumulator because a discharging current is lowered under a low-temperature state.

Further, when the electric power accumulator is charged under a low-temperature environment, a charging voltage in supplying a sufficient charging voltage to the electric power accumulator is required to be increased greatly because the internal resistance of the electric power accumulator is large. When a capacitor is used as the electric power accumulator, the charging voltage is generally controlled to be high under a normal temperature in order to reduce a loss by decreasing the charging current. However, if a sufficient charging current is supplied to the electric power accumulator having a very large internal resistance under a low temperature environment, the charging voltage may exceed the maximum value because of the very large internal resistance. In this case, charging the electric power accumulator may not be controlled.

Due to the above problems, when the hybrid-type construction machine is warmed up for driving under the low temperature environment, it is preferable not only to carry out the warm-up operation but also to reduce the internal resistance by heating the electric power accumulator. In order to drive the hybrid-type construction machine under the low temperature environment requiring the warm-up operation of the engine, it is preferable to previously heat the electric power accumulator by carrying out the warm-up operation of the electric power accumulator.

The present invention is provided in consideration of the above problems. The objects of the present invention are to provide a warm-up method for a hybrid-type construction machine and the hybrid-type construction machine which can efficiently and quickly heat the electric power accumulator.

Means for Solving Problems

In order to attain the above objects, embodiments of the present invention may provide a warm-up method for a hybrid-type construction machine whose engine is driven by turning on the ignition key of the engine to thereby heat an electric power accumulator if the temperature of the electric power accumulator is lower than a predetermined temperature.

It is preferable for the warm-up method of the hybrid-type construction machine to heat the electric power accumulator by charging and discharging the electric power accumulator by operating the motor generator while the engine is driven to carry out warm-up operations if the temperature of the electric power accumulator is lower than the predetermined temperature.

Further, it is preferable for the warm-up method of the hybrid-type construction machine to charge and discharge the electric power accumulator by changing a target state of charge (charge rate) of the electric power accumulator. If the electric power accumulator is discharged, the target state of charge (charge rate) may be set low. If the electric power accumulator is charged, the target state of charge may be set high. Further, in the above warm-up method of the hybrid-type construction machine, the electric power accumulator may be charged and discharged by changing power required by an electrical load. When the engine is started to drive while the temperature of the electric power accumulator is lower than the predetermined temperature, the rotational speed of the engine may be set higher than the rotational speed after the warm-up.

According to another embodiment of the present invention, there is provided a hybrid-type construction machine which carries out a warm-up process with a warm-up method for the hybrid-type construction machine including an engine assisted by a motor generator, an electric power accumulator configured to supply electric power to the motor generator, a motor as an electrical load, and a path configured to connect one of the engine and the motor to the electric power accumulator.

It is more preferable to provide a control unit for controlling opening and closing of a shutter mechanism based on the temperature of the electric power accumulator, an exhaust gas temperature of the engine, and the air temperature of air exhausted from the motor. Further, it is more preferable to further provide a cooling fan for exhausting the air inside the electric power accumulator and cooling the electric power accumulator. The control unit may further control the cooling fan based on the temperature of the electric power accumulator, the exhaust gas temperature and the temperature of the air exhausted from the motor. More preferably, the cooling fan is a fan having a shutter. The hybrid-type construction machine may further include a shutter mechanism for opening and closing the path.

Effect of the Invention

According to the present invention, by warming up an electric power accumulator in advance, it is possible to control charging and discharging the electric power accumulator while the internal resistance is great. Therefore, it is possible to stably drive a hybrid-type construction machine.

Other objects, features, and advantages of the present invention will become more apparent from the following detailed description when read in conjunction with the accompanying drawings.

DETAILED DESCRIPTION OF THE PREFERRED EMBODIMENTS

A warm-up method of an Embodiment of the present invention is carried out to warm up an electric power accumulator such as a battery provided in a hybrid-type construction machine. The hybrid-type construction machine may be any construction machine which drives a hydraulic pump while assisting an engine with a motor generator driven by electric power supplied from a battery to work as the hybrid-type construction machine. The hybrid-type construction machine may be a power shovel, a lifting magnet vehicle, a crane and a wheel loader.

At first, the hybrid shovel is described as an example of the hybrid-type construction machine to which the present invention is applied.

Figure 1:
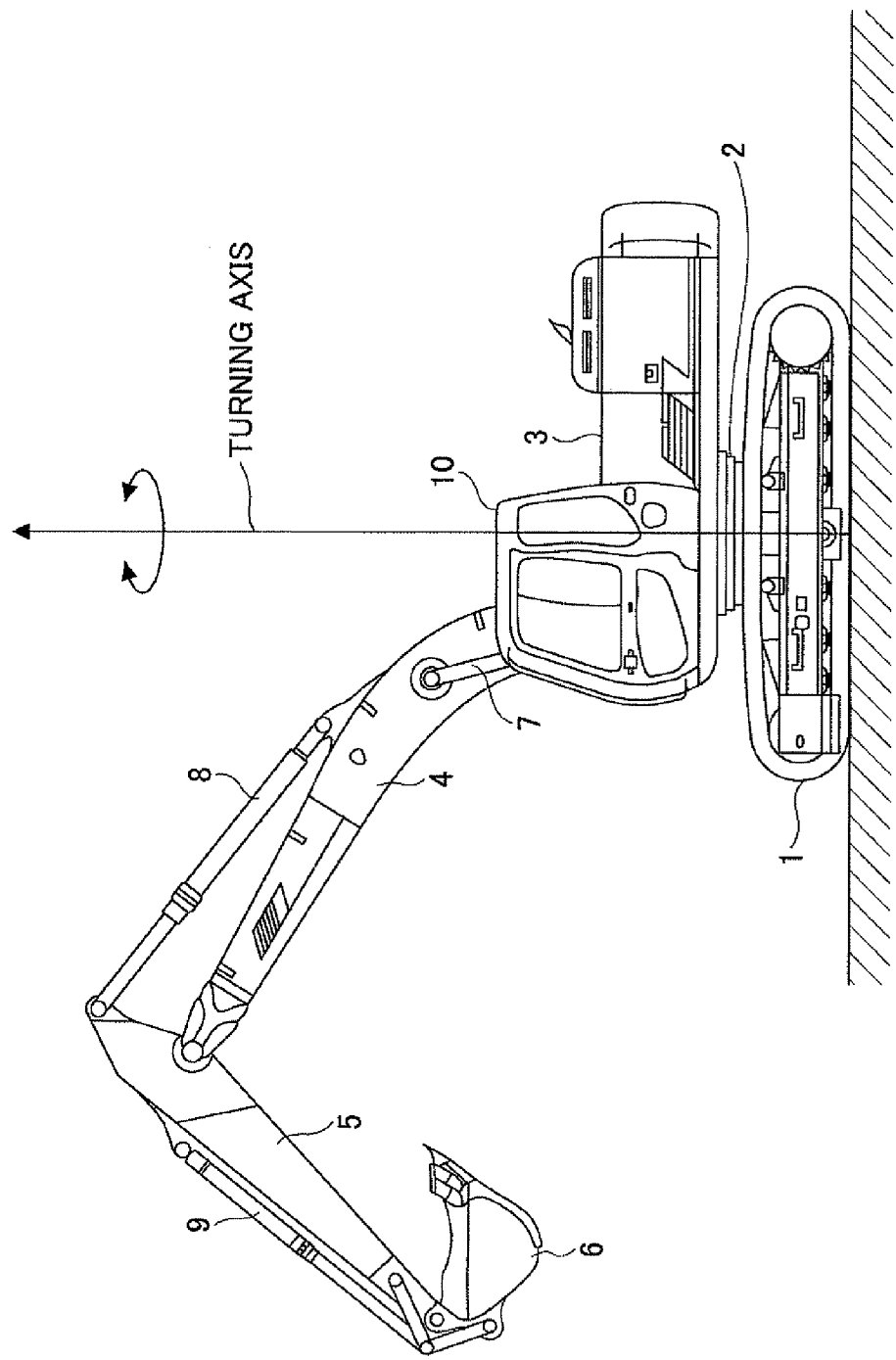
FIG. 1 is a side view of a hybrid shovel.

FIG. 1 is a side view of a hybrid shovel. An upper-part turning body 3 is mounted on a lower-part traveling body 1 of the hybrid shovel via a turning mechanism 2. A boom 4 extends from the upper-part turning body 3. An arm 5 is connected to the end of the boom 4. Further, a bucket 6 is connected to the end of the arm 5. The boom 4, the arm 5, and the bucket 6 are hydraulically driven by a boom cylinder 7, an aim cylinder 8, and a bucket cylinder 9, respectively. Further, a cabin 10 and power sources (not graphically illustrated) are mounted on the upper-part turning body 3.

Figure 2:
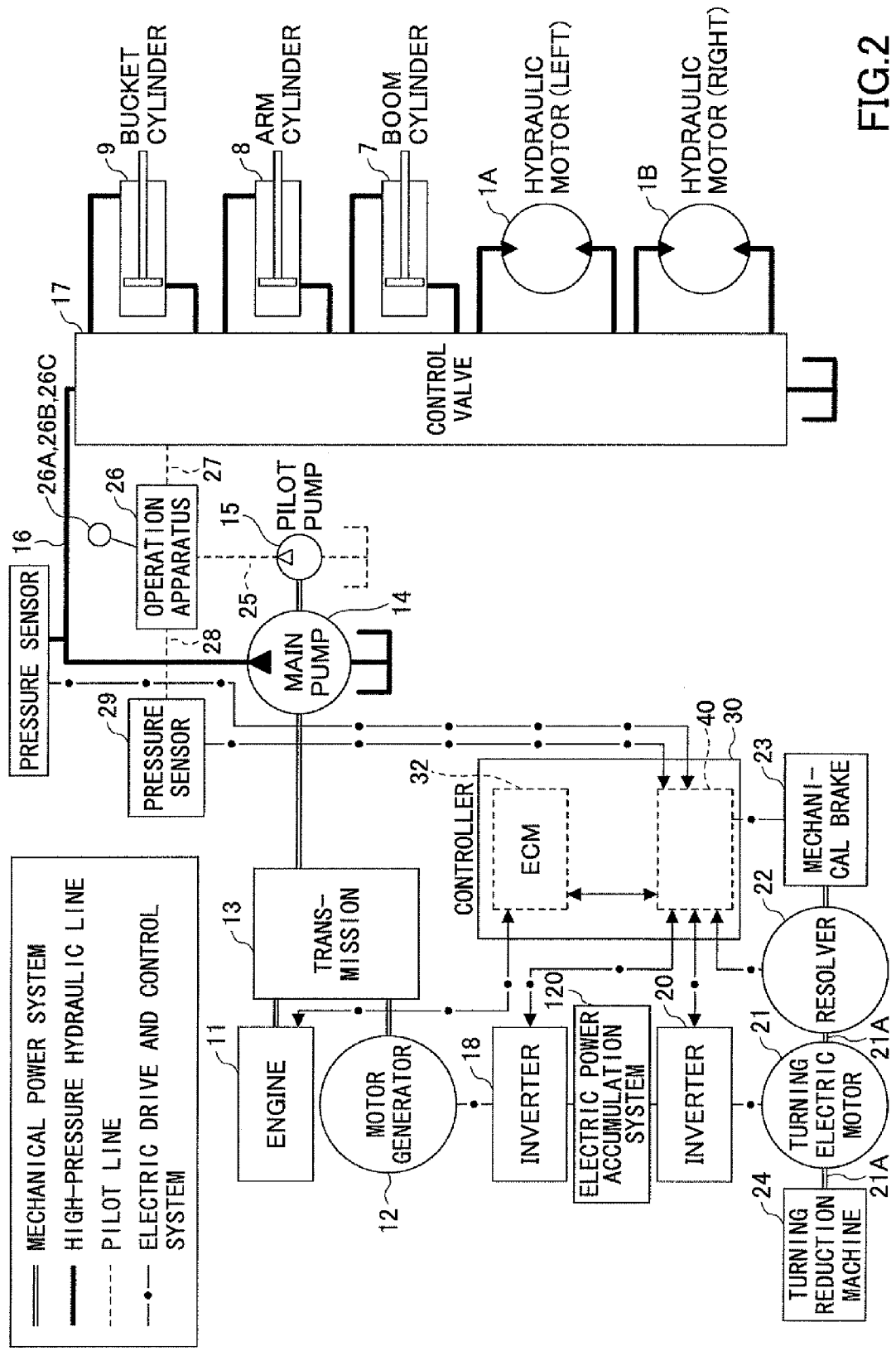
FIG. 2 is a diagram illustrating a modeled drive system of the hybrid shovel illustrated in FIG. 1.

FIG. 2 is a diagram illustrating a modeled drive system of the hybrid shovel illustrated in FIG. 1. In FIG. 2, a double line, a solid line, a broken line, and a one-dot-chain line indicate a mechanical power system, a high-pressure hydraulic line, a pilot line, and an electric drive and control system, respectively.

An engine 11 as a mechanical drive part and a motor generator 12 as an assist drive part are connected to the input corresponding shafts of a transmission 13 as a power-up machine. A main pump 14 and a pilot pump 15 are connected to the output shaft of the transmission 13. A control valve 17 is connected to the main pump 14 via a high-pressure hydraulic line 16. Here, the engine 11 and the motor generator 12 may be directly connected without using the transmission 13.

The control valve 17 is a control unit that controls a hydraulic system. Hydraulic motors 1A (for the right) and 1B (for the left) for the lower-part traveling body 1, the boom cylinder 7, the arm cylinder 8, and the bucket cylinder 9 are connected to the control valve 17 via high-pressure hydraulic lines.

A battery 19 as the electric power accumulator is connected to the motor generator 12 via an inverter 18. A turning electric motor 21 is connected to the battery 19 via an inverter 20. The turning electric motor 21 is an electrical load in the hybrid shovel. A resolver 22, a mechanical brake 23, and a turning reduction machine 24 are connected to a rotation shaft 21A of the turning electric motor 21. An operation apparatus 26 is connected to the pilot pump 15 via a pilot line 25. The control valve 17 and a pressure sensor 29 as a lever operation detecting part are connected to the operation apparatus 26 via hydraulic lines 27 and 28, respectively. The pressure sensor 29 is connected to a controller 30 that controls driving of an electric system.

The hybrid hydraulic shovel having the above-described configuration is a hybrid-type construction machine that uses the engine 11, the motor generator 12, and the turning electric motor 21 as power sources. These power sources are mounted on the upper-part turning body 3 illustrated in FIG. 1. A description is given below of each of these parts.

The engine 11, which is, for example, an internal combustion engine constituted of a diesel engine, has its output shaft connected to one of the input shafts of the transmission 13. The engine 11 is operated constantly during the operation of the construction machine.

The motor generator 12 may be an electric motor capable of performing both a power running operation and a generator operation. Here, a motor generator driven by the inverter 18 is illustrated as the motor generator 12. This motor generator 12 may be constituted of, for example, an IPM (Interior Permanent Magnetic) motor having magnets embedded in a rotor. The rotation shaft of the motor generator 12 is connected to the other one of the input shafts of the transmission 13. In this embodiment, the motor generator capable of performing both the power running operation and the generator operation is used. Alternatively, an electric motor that performs the power running operation and a generator that performs the generator operation may be connected to the engine 11 via a transmission.

The transmission 13 has two input shafts and one output shaft. The two input shafts are connected to the drive shaft of the engine 11 and the drive shaft of the motor generator 12, respectively. Further, the output shaft is connected to the drive shaft of the main pump 14. The power running operation and the generator operation of the motor generator 12 are switched by the controller 30 in accordance with a load on the engine 11.

The main pump 14 is a hydraulic pump that generates a hydraulic pressure to be supplied to the control valve 17. The hydraulic pressure generated in the main pump 14 is supplied via the control valve 17 in order to drive the hydraulic motors 1A and 1B, the boom cylinder 7, the arm cylinder 8, and the bucket cylinder 9, which are hydraulic loads. The pilot pump 15 generates a pilot pressure necessary for a hydraulic operation system.

The control valve 17 is a hydraulic pressure control unit that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling a corresponding hydraulic pressure to be supplied to each of them in accordance with an input of an operation by an operator.

The inverter 18, which is provided between the motor generator 12 and the battery 19 as described above, controls the operation of the motor generator 12 based on commands from the controller 30. Therefore, when controlling the electric motor operation of the motor generator 12, the inverter 18 supplies necessary electric power to the motor generator 12 from a power accumulation system 120. While the generator operation of the motor generator 12 is being controlled, the inverter 18 charges the electric power accumulation system 120 with the electric power generated by the motor generator 12.

The electric power accumulation system 120, which includes the electric power accumulator, is provided between the inverter 18 and the inverter 20. Therefore, the electric power accumulation system 120 serves as a power supply for supplying necessary electric power for a power running operation when at least one of the motor generator 12 and the turning electric motor 21 is performing the power running operation. The electric power accumulation system 120 uses the electric power generated by a generator operation or a regenerative operation to store electric energy when at least one of the motor generator 12 and the turning electric motor 21 is performing the generator operation or the regenerative operation. A capacitor (an electric double layer capacitor) may be used as the battery 19 in the electric power accumulation system 120. However, the battery 19 is not limited to a capacitor, and may be any battery as long as the battery may be charged and discharged repeatedly.

The inverter 20, which is provided between the turning electric motor 21 and the electric power accumulation system 120 as described above, controls the operation of the turning electric motor 21 based on commands from the controller 30. Thus, during the power running operation of the turning electric motor 21, necessary electric power is supplied from the battery 19 to the turning electric motor 21. Further, during the regenerative operation of the turning electric motor 21, the electric power accumulation system 120 is charged with the electric power generated by the turning electric motor 21. Here, in FIG. 2, an electric motor is used as the turning electric motor 21. However, the electric motor may also be used for other purposes than turning. Further, multiple electric motors may be connected to the electric power accumulation system 120 and be controlled.

The turning electric motor 21, which may be an electric motor capable of both a power running operation and a regenerative operation, is provided in order to drive the turning mechanism 2 of the upper-part turning body 3. At the time of the power running operation, the rotating force of the rotational drive power of the turning electric motor 21 is amplified by the reduction machine 24, and the upper-part turning body 3 makes a rotational movement while being subjected to acceleration or deceleration control. Further, the rotational speed is increased in the reduction machine 24 by the inertial rotation of the upper-part turning body 3 to be transmitted to the turning electric motor 21, thereby making it possible to regenerate electric power. Here, an AC electric motor driven by the inverter 20 based on a PWM (Pulse Width Modulation) control signal is illustrated as the turning electric motor 21. This turning electric motor 21 may be constituted of, for example, an IPM motor of a magnet embedded type.

The operation apparatus 26, which is an input device for an operator of the hybrid hydraulic shovel to operate the turning electric motor 21, the lower-part traveling body 1, the boom 4, the arm 5, and the bucket 6, includes levers 26A and 26B and pedals 26C. The lever 26A, which is a lever for operating the turning electric motor 21 and the arm 5, is provided near the driver's seat of the upper-part turning body 3. The lever 26B, which is a lever for operating the boom 4 and the bucket 6, is provided near the driver's seat. The pedals 26C, which are a pair of pedals for operating the lower-part traveling body 1, are provided at the foot of the driver's seat.

The operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the levers 26A and 26B and the pedal 26C are operated, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thus, the lower-part traveling body 1, the boom 4, the arm 5, and the bucket 6 are driven.

The hydraulic line 27, which is actually composed of eight hydraulic lines in total: two each for operating the hydraulic motors 1A and 1B (that is, four in total) and two each for operating the boom cylinder 7, the arm cylinder 8, and the bucket cylinder 9 (that is, six in total), is illustrated as a single hydraulic line for convenience of description.

In the pressure sensor 29 as a lever operation detecting part, a change in the hydraulic pressure inside the hydraulic line 28 due to the turning operation of the lever 26A is detected. The pressure sensor 29 outputs an electrical signal representing the hydraulic pressure inside the hydraulic line 28. This electrical signal is input to the controller 30. This makes it possible to determine the amount of turning operation of the lever 26A with accuracy. Further, while a pressure sensor is used as a lever operation detecting part in this embodiment, a sensor may alternatively be used that reads the amount of turning operation of the lever 26A directly as an electrical signal.

The controller 30, which is a control unit that controls driving of the hybrid hydraulic shovel, includes an engine control part 32 and a drive control unit 40. The engine control part 32 sets a target rotational speed at the time of operating the engine and controls the amount of fuel injected for maintaining the rotational speed.

The drive control unit 40 controls the outputs of the turning electric motor 21, the motor generator 12, and the main pump 14 based on signals from the pressure sensor 29, the inverters 18 and 20, and the resolver 22.

Next, a description is given of drive control of a hybrid shove according to a first embodiment of the present invention.

Figure 3:
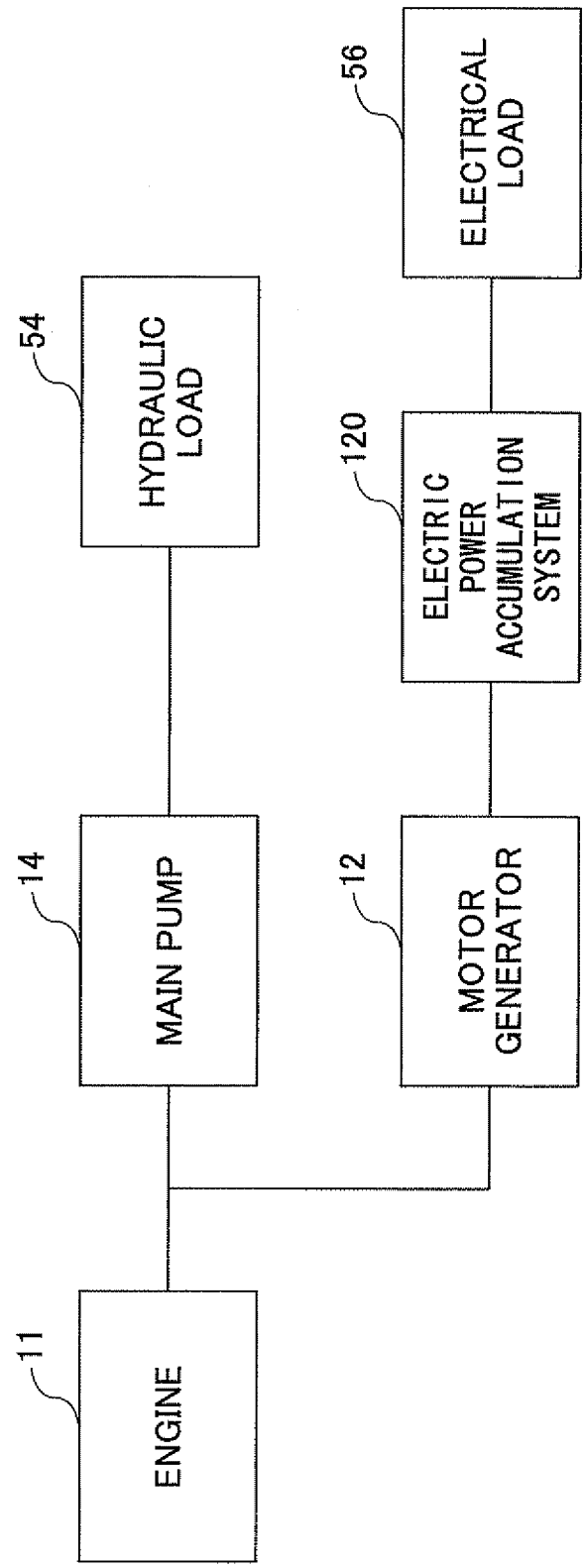
FIG. 3 is a diagram illustrating a modeled power system of the hybrid shovel illustrated in FIG. 1.

FIG. 3 is a diagram illustrating a modeled power system of the hybrid shovel illustrated in FIG. 1. In the model diagram of FIG. 3, a hydraulic load 54, which corresponds to components driven with hydraulic pressure, includes the boom cylinder 7, the arm cylinder 8, the packet cylinder 9, and the hydraulic motors 1A and 1B. When considered as a load requiring hydraulic pressure to be generated, however, the hydraulic load 54 corresponds to the main pump 14 as a hydraulic pump that causes a hydraulic pressure to be generated. The engine 11 supplies power to the main pump 14 being a hydraulic pump. The power generated by the engine 11 is converted into hydraulic pressure by the main pump 14, and the hydraulic pressure is supplied to the hydraulic load 54.

An electrical load 56, which corresponds to components driven with electric power, such as an electric motor and an electric actuator, includes the turning electric motor 21. Electric power is supplied from a power accumulation unit of the power accumulation system 120 to the electrical load 56 via a converter. In the power running operation, the electrical load 56 is driven. The electrical load 56 can regenerate electric power like an electric motor and generator, for example. The regenerated electric power is supplied to and stored in the electric power accumulation unit of the electric power accumulation system 120 via the converter or is supplied to the motor generator 12 via the converter to serve as electric power for driving the motor generator 12.

The electric power accumulation system 120 is charged with regenerated electric power from the electrical load 56 as described above. Further, when the motor generator 12 receives power from the engine 11 and functions as a generator, it is also possible to supply the electric power and charge the electric power accumulation system 120 with the electric power generated by the motor generator 12. In the embodiment, a capacitor (an electric double layer capacitor) may be used as the electric power accumulation unit of the electric power accumulation system 120.

Figure 4:
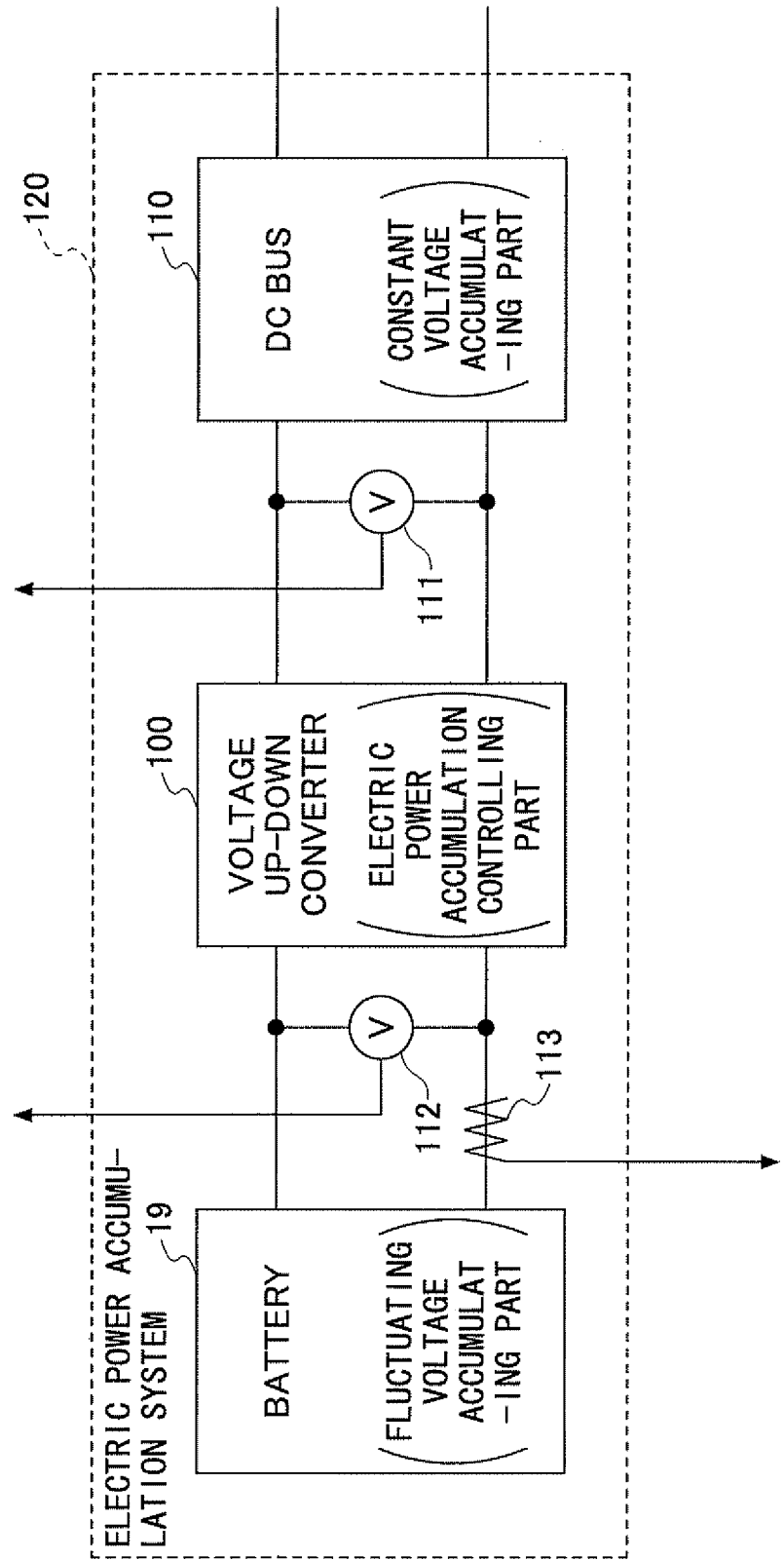
FIG. 4 is a block diagram illustrating an electric power accumulation system illustrated in FIG. 3.

FIG. 4 illustrates a detailed internal configuration of the electric power accumulation system 120. The electric power accumulation system 120 is configured with a DC bus 110 as a constant voltage accumulating part, a voltage up-down converter 100 as an electric power accumulation controlling part, and a battery 19 as a fluctuating voltage accumulating part.

One end of the voltage up-down converter 100 is connected to the motor generator 12 and the turning electric motor 21, and the other end is connected to the battery 19 to thereby switch between voltage up and down operations to bring the DC bus voltage value within a constant range. When the motor generator 12 carries out a motor (assist) operation, it is necessary to increase the DC bus voltage value for supplying electric power to the motor generator 12 via the inverter 18. Therefore, it is necessary to raise the DC bus voltage. On the other hand, when the motor generator 12 carries out a generator operation, it is necessary to decrease the DC bus voltage for charging the battery 19 of the electric power accumulation system 120 with the generated electric power via the inverter 18. Increasing and decreasing of a voltage into the turning electric motor 21 are similar to the above. The operation state of the motor generator 12 is switched in response to the load state of the engine 11. The operation state of the turning electric motor 21 is switched in response to the turning operation of the upper-part turning body 3. Therefore, one of the motor generator 12 and the turning electric motor 21 may carry out the motor (assist) operation or the power running operation, and the generator operation or the regenerative operation, respectively.

The voltage up-down converter 100 controls switching between the voltage up and down operations of the DC bus to maintain voltage value within a predetermined range in response to the operation states of the motor generator 12 and the turning electric motor 21.

The DC bus 110 is provided between the voltage up-down converter 100 and the inverters 18 and 20 enabling the electric power to be exchanged among the battery 19, the motor generator 12 and the turning electric motor 21.

A DC bus voltage detection part 111 detects a DC bus voltage value. The detected DC bus voltage value input into the controller 30 is used to control switching between the voltage-up operation and the voltage-down operation to maintain the DC bus voltage value within the predetermined range.

A battery voltage detection part 112 detects the voltage value of the battery 19, and is used to detect a charge state of the battery 19. The battery voltage value detected by the battery voltage detection part 112 is input into the controller 30, and is used to perform the switching control between the voltage-up operation and the voltage-down operation of the up-down converter 100.

A battery current detection part 113 corresponds to a current detection part for detecting the current value of the battery 19. The battery current value detected based on the current which flows from the battery 19 to the voltage up-down converter 100 is positive. The battery current value detected by the battery current detection part 113 is input into the controller 30, and is used to perform the switching control between the voltage-up operation and the voltage-down operation in the voltage up-down converter 100.

When the above described hybrid shovel is driven in cold climates under a low-temperature environment of, for example, −30° C., it is necessary to carry out a warm-up operation before the hybrid shovel is normally driven. The engine 11 is normally subjected to a warm-up operation where the engine 11 is run for a predetermined time under a non-load state. During the warm-up operation, the rotational speed of the engine 11 is set to be higher than the ordinary rotational speed to enhance heating of the engine 11. Said differently, during the warm-up operation after starting the engine 11, the engine 11 is run at the rotational speed higher than the normal rotational speed used after the warm-up to thereby control the temperature of the engine 11 to quickly become the temperature for the normal operation.

After the warm-up operation of the engine 11 is completed, the main pump 14 is driven by the engine 11 to thereby carry out the warm-up operation of the hydraulic drive system. After the warm-up operation of the drive system is completed, the normal operation mode can be used. However, if the battery 19 is cold, the internal resistance of the battery is large and a charging and discharging current becomes small. If the normal operation is carried out under such a state, assisting with the motor generator 12 becomes insufficient or power supply to the electrical load 56 becomes insufficient. Then, an operator may not do an intended amount of work. Further, the charging voltage may become excessively high in charging the battery 19 due to the high internal resistance of the battery 19. In this case, the battery 19 may not be controlled.

Therefore, it is preferable to warm the battery 19 up at a time of carrying out a warm-up operation of the engine 11 and a warm-up operation of the hydraulic drive system. In the Embodiment described below, the battery 19 may be warmed up by using internal heat of the battery 19. Said differently, when the temperature of the battery 19 is low, the battery is forcibly charged and discharged to generate internal heat to thereby reduce the internal resistance with the increased temperature of the battery.

Figure 5:
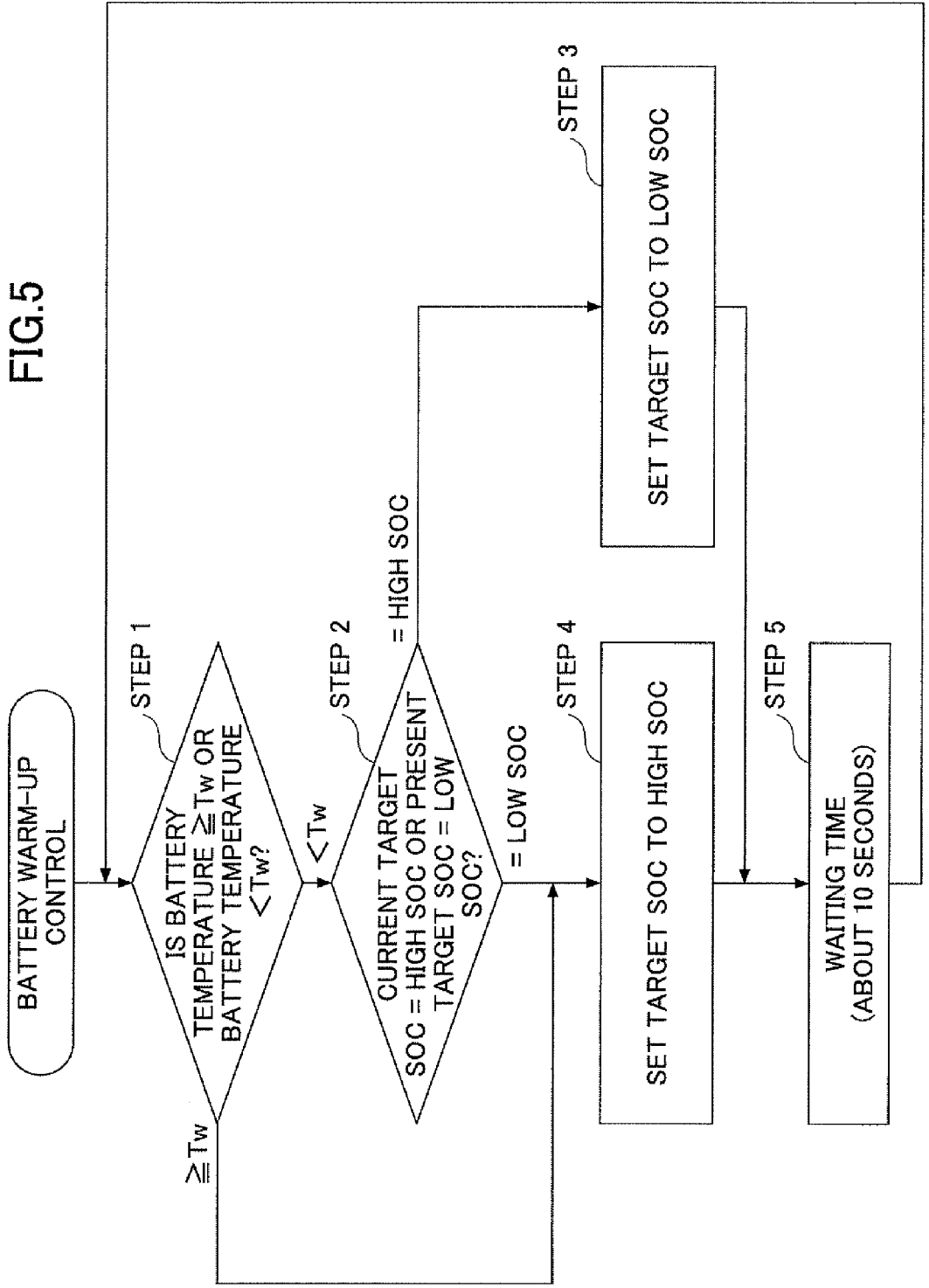
FIG. 5 is a flowchart of a battery warm-up process.

FIG. 5 is a flowchart of the battery warm-up process with the Embodiment. The battery warm-up process illustrated in FIG. 5 is carried out when the hydraulic shovel is started to be driven.

In step 1, it is determined whether the temperature of the capacitor forming the battery 19 is greater than or equal to a warm-up set value Tw or less than the warm-up set value Tw.

The warm-up set value Tw is previously determined based on the internal resistance of the capacitor and an ordinarily acceptable charging and discharging current. The capacitor forming the battery 19 shows a temperature increment after repeating charges and discharges under the normal operation after the warm-up. Therefore, it is unnecessary to completely warm the battery 19 (capacitor) up at the time of finishing the warm-up operation of the battery 19. The degree of the warm-up may be sufficient as long as the battery 19 is practically usable and not causing trouble with the driving operation.

As described above, the temperature of the capacitor forming the battery 19 increases by repeating the charges and discharges under the normal operation after the warm-up. Therefore, it is necessary to cool the capacitor forming the battery 19 under the normal drive. Then, in a case where a cooling system is provided for the battery 19, it is preferable to prevent the cooling system from operating during the warm-up.

The temperature of the battery 19 used in step 1 is actually measured. The capacitor of the battery 19 is ordinarily a capacitor unit including many capacitors arranged in a three-dimensional matrix form. Hereinafter, the battery 19 may be referred to as a capacitor unit 19. The capacitor unit 19 may have a temperature distribution. For example, temperature sensors such as a thermistor are attached to four capacitors of the capacitor unit to detect the temperatures in the temperature sensors. The average of the four temperatures may be determined as the temperature of the capacitor unit 19. The temperature of the capacitor at the center of the capacitor unit 19 may become greater than the temperature of the capacitor at a peripheral position of the capacitor unit 19. Therefore, it is sufficient to properly select the capacitor to which the temperature sensor is attached to obtain the average temperature. Alternatively, a relationship between the temperature of a capacitor unit at a predetermined position and an average temperature of the capacitor unit 19 may be previously checked and the temperature at the predetermined position may be converted to the average temperature based on the relationship. The predetermined position may be a central position on the outer surface of the capacitor unit 19 and an electrode terminal of the capacitor unit 19. Further, the actual measurement value of the capacitor temperature arranged at the outermost side may be used to determine the warm-up operation.

In step 1, if it is determined that the temperature of the battery 19 is lower than the warm-up set value Tw, the process goes to step 2. In step 2, it is determined whether a current target state of charge (charge rate) of the battery 19 is set to be high SOC or low SOC.

The high SOC is a state of charge (charge rate) enabling the battery 19 to be sufficiently discharged and be charged under the normal operation. On the other hand, the low SOC is a state of charge (charge rate) smaller than the target state of charge (charge rate) of the battery 19 set under the normal operation.

If it is determined that the current target state of charge (charge rate) is set to be the high SOC in step 2, the process goes to step 3. The current target state of charge is set to be the low SOC in step 3. The current target state of charge (charge rate) is switched from the high SOC to the low SOC in step 3.

If it is determined in step 2 that the current target state of charge (charge rate) is set to be the low SOC in step S2, the process goes to step 4. The current target state of charge is set to be the high SOC in step 4. Said differently, the current target state of charge (charge rate) is switched from the low SOC to the high SOC in step 4.

After steps 3 and 4, the process goes to step 5. In step 5, the process waits for a predetermined time (e.g., 10 seconds). Thereafter, the process goes back to step 1.

The processes of steps 1 to 5 are described in detail. If the temperature of the battery 19 is determined to be lower than the warm-up set value Tw, the warm-up is necessary to increase the temperature of the battery 19. If it is determined that the current target state of charge (charge rate), i.e., a target SOC, of the battery 19 is set to be the high SOC in step 2, the target state of charge (charge rate) is changed from the high SOC to the low SOC in step 3. Because the current state of charge of the battery 19 may become closer to the current target state of charge being the high SOC, if the target state of charge is changed to the low SOC, the current state of charge becomes higher than the target state of charge. Thus, the battery is controlled and discharged to be the low SOC.

In order to discharge the battery 19, the assist motor (motor generator) 12 is driven or the electrical load 56 is driven. In the embodiment, the assist motor 12 is driven by a discharging current from the battery 19. If the process goes from step 1 through step 2 to step 3, the assist motor is driven along with discharging of the battery 19, and the discharging state is maintained for 10 seconds, for example. Said differently, the battery is discharged for 10 seconds.

Thereafter, the process returns back to step 1 and proceeds to step 2. Then, it is determined that the current target state of charge (target SOC) of the battery 19 is set to be the low SOC. Therefore, the process goes to step 4, and the current target state of charge is changed from the low SOC to the high SOC. Because the current state of charge of the battery 19 may become closer to the current target state of charge being the low SOC, if the target state of charge is changed to the high SOC, the current state of charge becomes lower than the target state of charge. Thus, the battery is controlled and charged to be the high SOC.

In order to charge the battery 19, the assist motor 12 may generate electricity by being driven by the engine 11, or the electrical load 56 may carry out a regenerative operation. In the Embodiment, by causing the assist motor to function as a generator, a charging current may be supplied to the battery 19. If the process goes from step 1 through step 2 to step 4, the assist motor 12 is driven along with charging of the battery 19, and the charging state is maintained for 10 seconds, for example. Said differently, the battery 19 is charged for 10 seconds.

Figure 6:
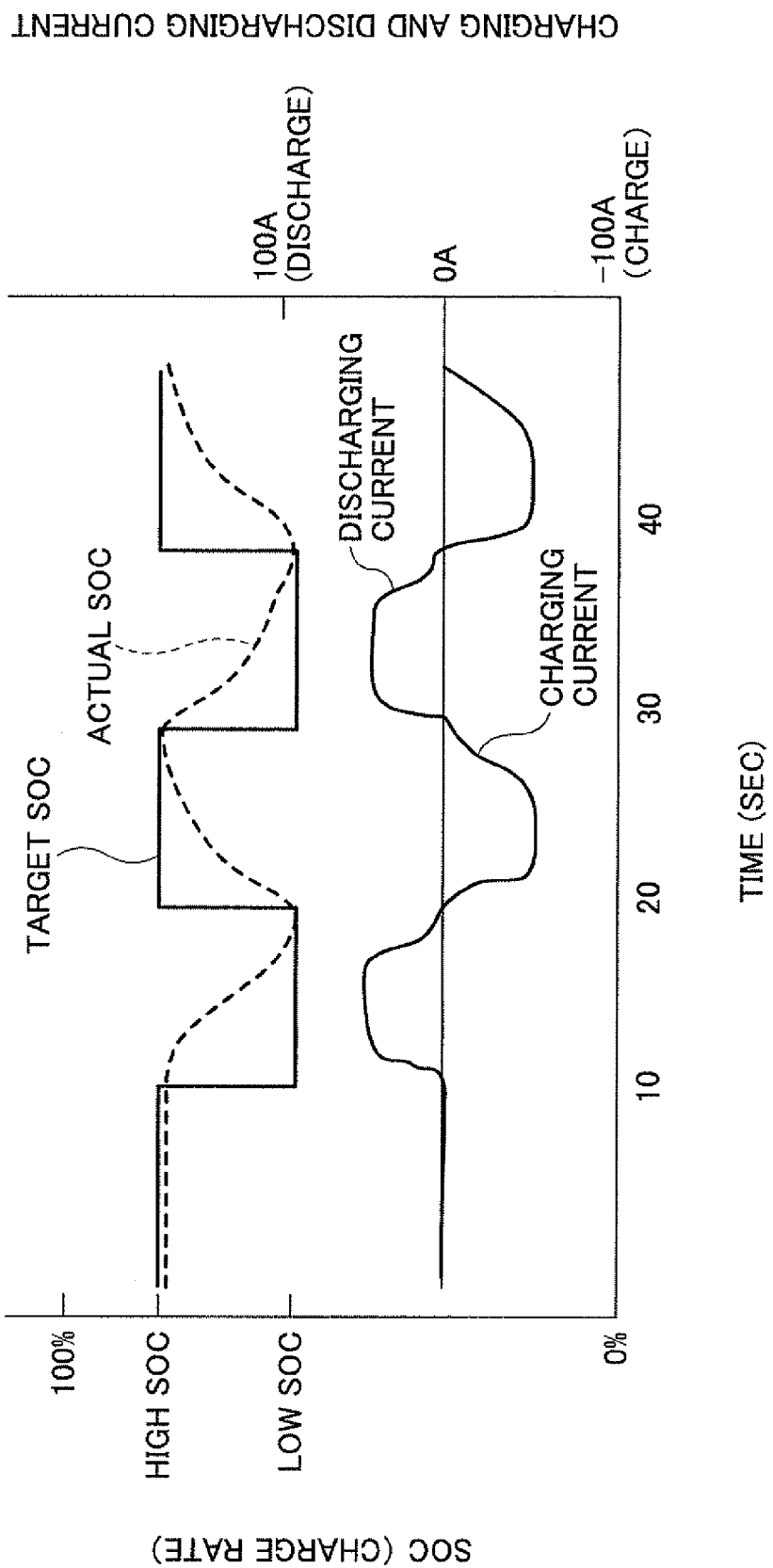
FIG. 6 is a graph illustrating a change of a state of charge (charge rate) of a battery subjected to the battery warm-up and a change of an electric current flowing through the battery.

By repeating the above processes, charging and discharging of the battery 19 are repeated for 10 seconds, respectively. FIG. 6 is a graph illustrating changes of a state of charge (charge rate) of the battery 19 and a current flowing through the battery 19 while the battery warm-up process is carried out. Referring to FIG. 6, the target state of charge (target SOC) indicated by a solid line is alternately switched between the high SOC and the low SOC every 10 second. Along with this switching, the current state of charge (actual SOC) of the battery 19 indicated by a dashed line increases and decreases. The current flowing through the battery 19 alternately becomes a charging current or a discharging current every 10 seconds.

Figure 7:
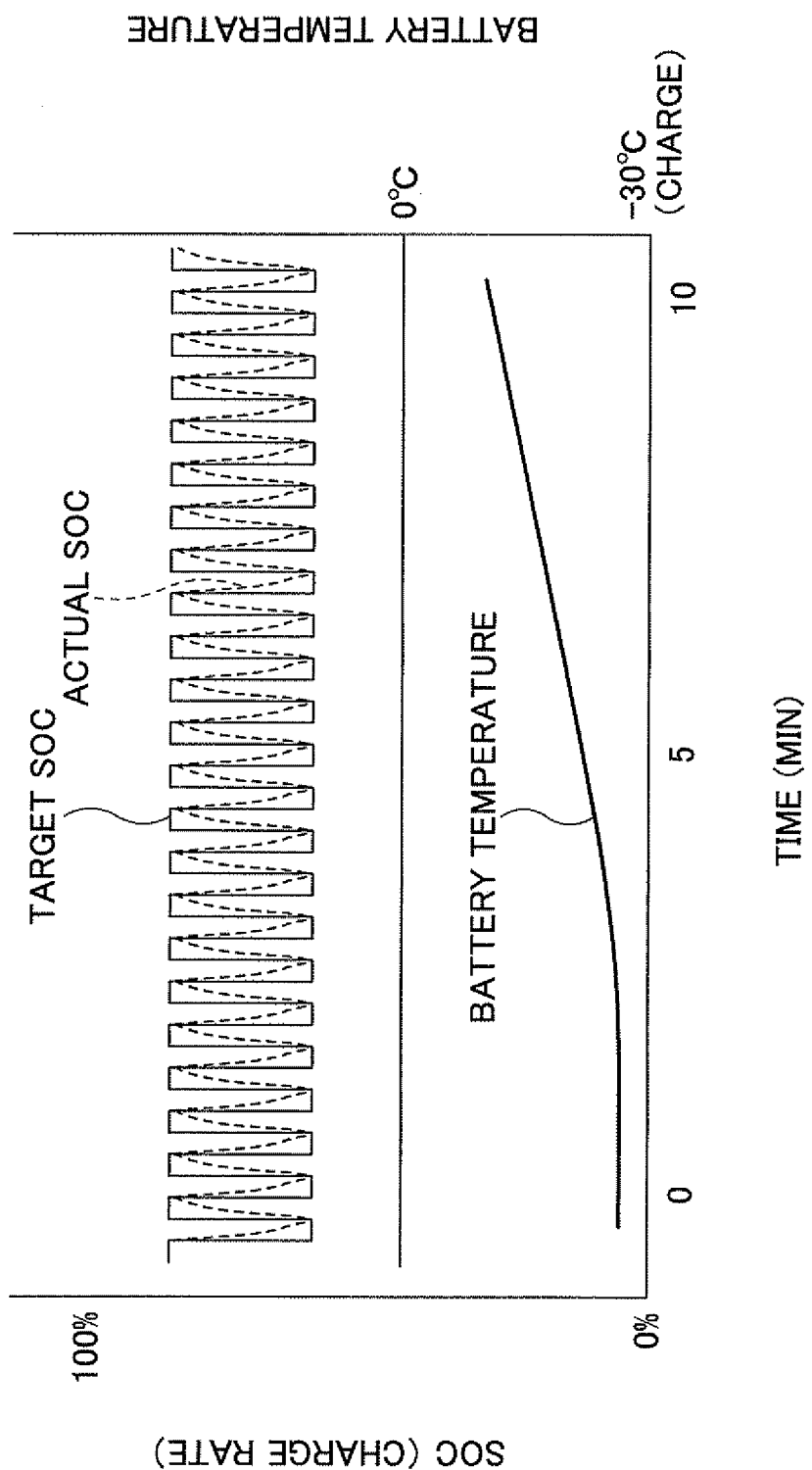
FIG. 7 is a graph illustrating the change of the state of charge (charge rate) and a temperature change of the battery after a battery warm-up process is carried out for ten minutes.

FIG. 7 is a graph illustrating a change of the state of charge and a temperature change of the battery 19 after repeating the processes of steps 1 to 5 for 10 minutes. It is known that the temperature of the battery 19 gradually increases by repeatedly changing the target state of charge (target SOC) indicated by the solid line and the current state of charge (actual SOC) as illustrated in FIG. 6. Since the charging and discharging of the battery 19 are repeated, the charging and discharging currents flow into the capacitor 19 to generate internal heat to thereby increase the temperature of the battery 19.

When the battery 19 is started to be heated, the engine 11 is still cool. Therefore, the engine 11 is warmed up together with the battery. A warm-up operation time of the engine 11 is ordinarily 10 minutes. During the warm-up operation time, the temperature of the battery 19 sufficiently increases. Then, the warm-up is completed and a normal operation can be substantially carried out.

If it is not a low-temperature environment, the temperature of the battery is determined to be a warm-up set value Tw or more in step 1 after a battery warm-up control is started at the time of starting the engine. Then, the process goes to step 4. At this time, since the target state of charge is set to be the high SOC being the normal setup, the high SOC being the normal setup is maintained in step 4. Said differently, if the starting is not under the low-temperature environment and the normal operation can be immediately started, the target state of charge is not changed to the low SOC and is maintained to be the normal high SOC at the beginning without warming up the battery 19.

As described, with the warm-up method of the Embodiment, when the temperature of the battery 19 is lower than the predetermined temperature, the engine 11 is driven to carry out the warm-up operation and the assist motor 12 is driven to charge and discharge the battery 19. Thus, the battery 19 is heated and warmed up. By forcibly charging and discharging the battery 19 while the battery temperature is low, the battery 19 can be warmed up. Therefore, without using a heating device such as a heater, the battery 19 is efficiently and quickly warmed up to a temperature enabling the normal operation in order to reduce the internal resistance.

When the battery 19 is discharged during the warm-up, the assist motor 12 is driven by the discharging current to return the power to the engine 11. Therefore, the discharged energy is not uneconomically consumed. Further, since the battery 19 is warmed up from the inside using the internal heat generation of the battery 19, the internal resistance can be effectively increased.

In the battery warm-up process of the Embodiment, the charge and discharge of the battery 19 are repeated by changing the target state of charge, and no operation exclusively for the warm-up is carried out. Therefore, even if a normal operation is carried out during the battery warm-up process, the normal operation can be immediately carried out.

Further, if the battery warm-up operation and the engine warm-up operation are simultaneously carried out, the rotational speed of the engine 11 is set higher in the warm-up operation. Therefore, the input and output of the battery 19 can be increased. Further, since the rotational speed of the engine 11 is set higher during the warm-up operation, the output can be increased. Therefore, if the normal operation is carried out during the warm-up operation, an uncomfortable feeling can be prevented.

Although the hybrid-type construction machine of a parallel type is exemplified in the Embodiment, the warm-up method of the Embodiment is applicable to a hybrid-type construction machine of a so-called serial type. In the series type, the motor generator 12 has only a function as a generator carrying out only a generator operation driven by the engine.

Next, another embodiment of the present invention is described. In the other embodiment of the present invention, the battery 19 is warmed up using generated heat or exhausted heat. For example, the battery 19 may be waited up by introducing an exhaust gas from the engine inside a casing of the battery 19, or the battery 19 may be warmed up by introducing air warmed by heat generated at a time of driving the turning electric motor 21.

Figure 8:
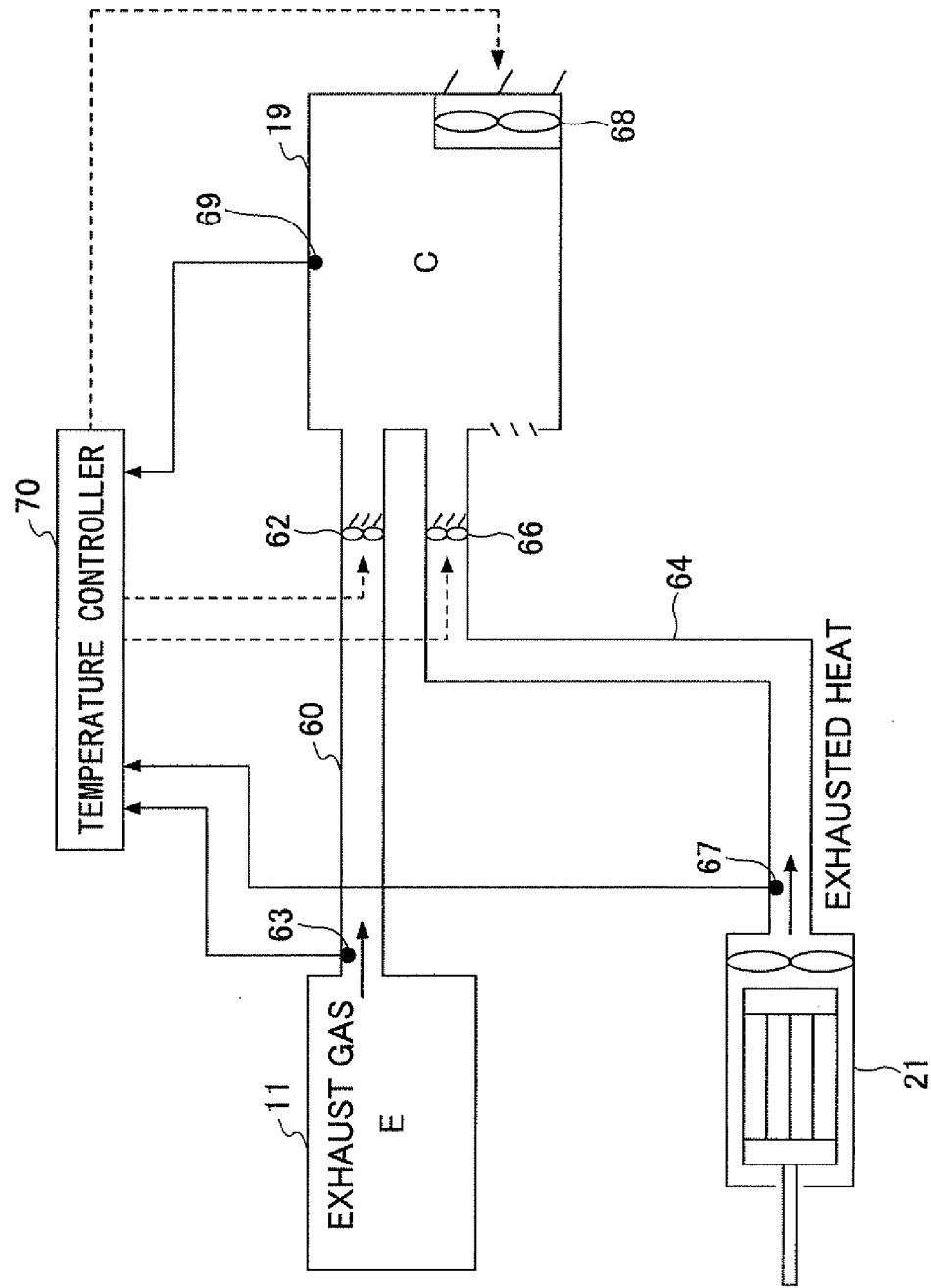
FIG. 8 illustrates a structure of a battery warm-up system.

FIG. 8 illustrates a structure of a battery warm-up system for carrying out a battery warm-up operation of the another embodiment. With the other embodiment, the exhausted heat from the engine 11 and the generated heat from the turning electric motor 21 are used as heat sources for warming up the battery 19. With the other embodiment, the battery 19 is a capacitor unit, and the same reference symbol 19 as that of the battery is attached to the capacitor unit. The capacitor unit 19 is formed such that a large number of capacitors in a three-dimensional matrix-like form are arranged in the casing. The battery warm-up system of the other embodiment is provided to warm up the above capacitor unit 19.

As illustrated in FIG. 8, an exhaust pipe of the engine 11 is connected to the capacitor unit 19 via an exhaust path 60. A fan 62 having a shutter is provided in the exhaust path 60. By turning on the fan having the shutter (opening the shutter and driving the fan), it is possible to introduce exhaust gas from the engine 11 into the capacitor unit 19. At around the exhaust pipe of the engine 11, an exhaust gas temperature sensor 63 for detecting an exhaust gas temperature is provided to supply a detected value (hereinafter, referred to as an engine temperature Teng) of the exhaust gas temperature to a temperature controller 70.

Further, the turning electric motor 21 is connected to the capacitor unit 19 via a heat ejection path. More specifically, a heat ejection path 64 is connected to a casing of the turning electric motor 21 to introduce air absorbing heat generated by operating the turning electric motor 21 into the heat ejection path 64. A fan 66 having a shutter is provided in the heat ejection path 64. By turning the fan 66 having the shutter on (said differently, by driving a fan as a blower mechanism while opening the shutter as a shutter mechanism), it is possible to introduce air absorbing heat from the turning electric motor 21 inside the capacitor unit 19. A temperature sensor 67 is for detecting the temperature of air ejected in the vicinity of an air ejecting part of the turning electric motor 21. The temperature sensor 67 supplies a detection value (hereinafter, referred to as a turning electric motor temperature Tsw) of the temperature of the air exhausted from the turning electric motor 21 to the temperature controller 70.

A fan 68 having a shutter is also provided in the casing of the capacitor unit 19. The fan 68 having the shutter is provided to cool the capacitor unit 19. The fan 68 having the shutter functions to exhaust air inside the capacitor unit 19 to the outside. Since the capacitor unit 19 generates heat at a time of charging and discharging the capacitor unit 19, it is necessary to cool the capacitor unit 19 while the hybrid shovel is driven under an ordinary environment. Then, by operating the fan 68 having the shutter, the warmed air can be exhausted to the outside. The capacitor unit 19 includes a temperature sensor 69 for detecting the temperature of the capacitor (hereinafter, referred to as a capacitor temperature Tcap). The detection value of the capacitor temperature is supplied to the temperature controller 70.

In the above described battery warm-up system, the temperature controller 70 controls the battery warm-up process for warming up the capacitor unit 19 based on the engine temperature Teng from the exhaust gas temperature sensor 63, the turning electric motor temperature Tsw from the temperature sensor 67 and the capacitor temperature Tcap from the temperature sensor 69. Said differently, the temperature controller 70 introduces the exhaust gas from the engine 11 or the air exhausted from the turning electric motor 21 into the capacitor unit 19 to warm the capacitor unit 19 up by controlling operations of the fan 62 having the shutter, the fan 66 having the shutter and the fan 68 having the shutter in a case where the capacitor temperature Tcap is low and less than the engine temperature Teng and the turning electric motor temperature Tsw. The fan 62 having the shutter, the fan 66 having the shutter and the fan 68 having the shutter including the shutter mechanisms and blower mechanisms are exemplified. However, the warm-up is made possible by connecting the exhaust path 60 or the heat rejection path 64 to the capacitor unit 19. Therefore, it is not always necessary to provide the fan 62 having the shutter, the fan 66 having the shutter and the fan 68 having the shutter.

The battery warm-up process is described in detail.

Figure 9:
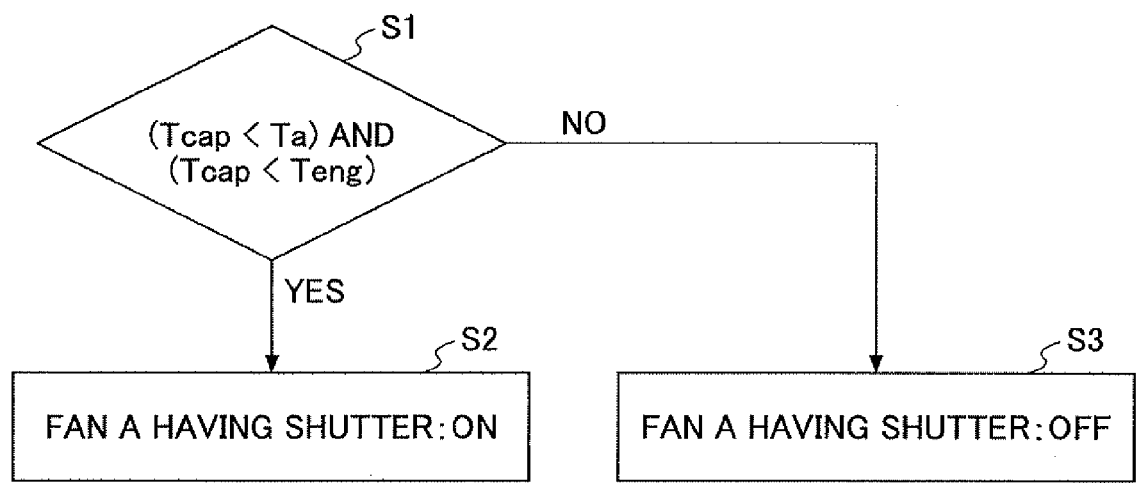
FIG. 9 is a flowchart illustrating a battery warm-up process using exhaust heat from an engine.

FIG. 9 is a flowchart of a battery warm-up process using heated engine exhaust gas. In step S1, it is determined whether the capacitor temperature Tcap is lower than a predetermined temperature A (hereinafter, referred to as a warm-up temperature Ta) and whether the capacitor temperature Tcap is lower than the engine temperature Teng. The warm-up temperature Ta is a threshold temperature for determining whether the capacitor unit 19 is warmed up. Said differently, if the capacitor temperature Tcap is lower than the warm-up temperature Ta, it is determined that the warm-up operation should be carried out. The warm-up temperature Ta is previously determined based on the internal resistance of the capacitor and a practically acceptable charging and discharging current. By comparing the capacitor temperature Tcap and the engine temperature Teng, it is determined whether the capacitor unit 19 is warmed up by the exhaust gas from the engine 11. Said differently, if the capacitor temperature Tcap is lower than the engine temperature Teng, it is determined that the capacitor unit 19 can be warmed up by introducing the exhaust gas from the engine 11.

In step S1, if it is determined that the capacitor temperature Tcap is lower than the warm-up temperature Ta (Tcap<Ta) and the capacitor temperature Tcap is lower than the engine temperature Teng (Tcap<Teng), the process goes to step S2. In step S2, the fan 62 having the shutter provided in the exhaust path 60 (a fan A having a shutter) is turned on and driven. When the fan 62 having the shutter is turned on, the shutter closing the exhaust path 60 is opened and the fan 62 starts to rotate. With this the exhaust gas from the engine 11 passes through the exhaust path 60 and is supplied inside the capacitor unit 19. Since the capacitor temperature Tcap is determined to be lower than the engine temperature Teng (Tcap<Teng), the exhaust gas temperature supplied to the capacitor unit 19 is higher than the temperature inside the capacitor unit 19. Therefore, the capacitor inside the capacitor unit 19 is warmed up by the exhaust gas from the engine 11. At this time, the fan 68 having the shutter provided in the capacitor unit 19 is turned on and exhausts the exhaust gas heating the capacitor to the outside of the capacitor unit 19.

Alternatively, if the conditions in which the capacitor temperature Tcap is lower than the warm-up temperature Ta (Tcap<Ta) or the capacitor temperature Tcap is lower than the engine temperature Teng (Tcap<Teng), and the conditions for which the process goes to step S2 are not established in step S1, the process goes to step S3 and the fan 62 having the shutter is turned off and not driven. [Note: previous sentence did not make sense as written. I made my best guess as to what you meant.] Said differently, in a case where the capacitor temperature Tcap is the warm-up temperature Ta or more (Tcap≥Ta), the capacitor temperature Tcap is the engine temperature Teng or more (Tcap≥Teng), or both of the conditions Tcap≥Ta and Tcap≥Teng are established, the fan 62 having the shutter is not driven and the exhaust gas from the engine 11 is not supplied to the capacitor unit 19. This is because the capacitor temperature Tcap is the warm-up temperature Ta or more (Tcap≥Ta) and the normal operation temperature. Therefore, it is unnecessary to warm the capacitor unit 19 up. Alternatively, if the capacitor temperature Tcap is the engine temperature Teng or more (Tcap≥Teng), the exhaust gas from the engine 11 cannot heat the capacitor unit 19 by supplying the exhaust gas from the engine 11. Also in this case, the fan 68 having the shutter may be turned on to thereby exhaust the warm air inside the capacitor unit 19 outside the capacitor unit 19 to perform normal cooling. In this, the fan 68 having the shutter mechanism and the blower mechanism is exemplified. However, if the exhausted heat from the engine smoothly flows into the capacitor unit 19, the blower mechanism is not always necessary.

Figure 10:
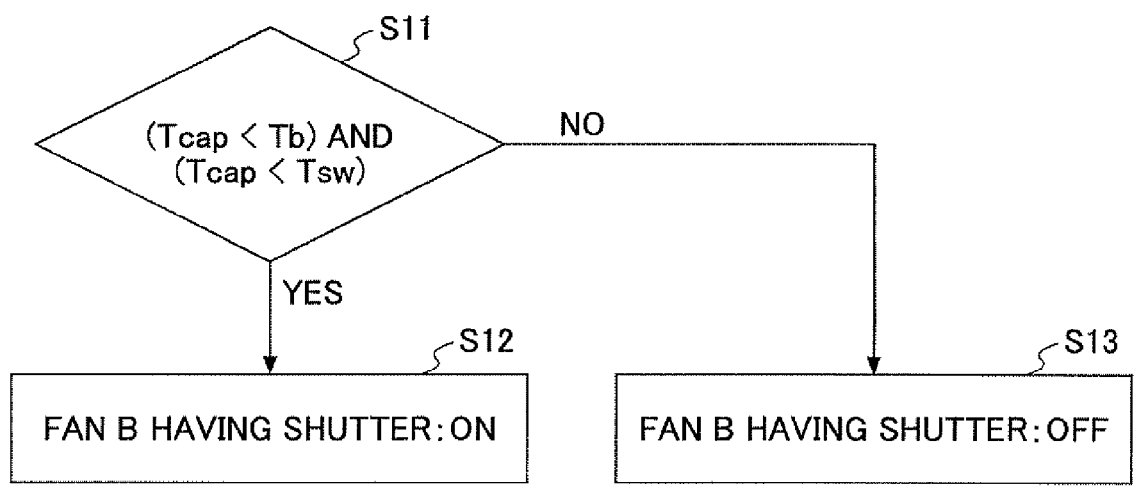
FIG. 10 is a flowchart illustrating a battery warm-up process using exhaust heat from a turning electric motor.

FIG. 10 is a flowchart illustrating a battery warm-up process using exhausted heat from the turning electric motor 21. In step S11, it is determined whether the capacitor temperature Tcap is lower than a predetermined temperature B (hereinafter, referred to as a warm-up temperature Tb) and whether the capacitor temperature Tcap is lower than the turning electric motor temperature Tsw. The warm-up temperature Tb is a threshold temperature for determining whether the capacitor unit 19 is warmed up. Said differently, if the capacitor temperature Tcap is lower than the warm-up temperature Tb, it is determined that the warm-up operation should be carried out. The warm-up temperature Tb is previously determined based on the internal resistance of the capacitor and a practically acceptable charging and discharging current in a similar manner to the warm-up temperature Ta. At first, it is determined whether the capacitor unit 19 can be warmed up with air from the turning electric motor 21 by comparing the capacitor temperature Tcap with the turning electric motor temperature Tsw. Said differently, if the capacitor temperature Tcap is lower than the turning electric motor temperature Tsw, it is determined that the capacitor unit 19 can be warmed up by introducing the air from the turning electric motor 21.

In step S11, if it is determined that the capacitor temperature Tcap is lower than the warm-up temperature Tb (Tcap<Tb) and the capacitor temperature Tcap is lower than the turning electric motor temperature Tsw (Tcap<Tsw), the process goes to step S12. In step S12, the fan 66 having the shutter provided in the exhaust path 64 (a fan B having a shutter) is turned on and driven. When the fan 66 having the shutter is turned on, the shutter closing the exhaust path 64 is opened and the fan 66 starts to rotate. With this, the air exhausted from the turning electric motor 21 passes through the heat ejection path 64 and supplied into the capacitor unit 19. Since the capacitor temperature Tcap is determined to be lower than the electric motor temperature Tsw (Tcap<Tsw), the air temperature supplied to the capacitor unit 19 is higher than the temperature inside the capacitor unit 19. Therefore, the capacitor inside the capacitor unit 19 is warmed up by the air from the turning electric motor 21. At this time, the fan 68 having the shutter provided in the capacitor unit 19 is turned on and exhausts the air heating the capacitor to the outside of the capacitor unit 19.

Alternatively, if the conditions in which the capacitor temperature Tcap is lower than the warm-up temperature Tb (Tcap<Tb) or the capacitor temperature Tcap is lower than the turning electric motor temperature Tsw (Tcap<Tsw) are not established, the process goes to step S13 and the fan 66 having the shutter is turned off and not driven. Said differently, in a case where the capacitor temperature Tcap is the warm-up temperature Tb or more (Tcap≥Tb), the capacitor temperature Tcap is the turning electric motor temperature Tsw or more (Tcap≥Tsw), or both of the conditions Tcap≥Tb and Tcap≥Tsw are established, the fan 66 having the shutter is not driven and the air from the turning electric motor 21 is not supplied to the capacitor unit 19. This is because the capacitor temperature Tcap is the warm-up temperature Tb or more (Tcap≥Tb) and the normal operation temperature. Therefore, it is unnecessary to warm the capacitor unit 19 up. Alternatively, if the capacitor temperature Tcap is the turning electric motor temperature Tsw or more (Tcap≥Tsw), the exhaust gas (air) from the turning electric motor 21 cannot heat the capacitor unit 19 by supplying the exhaust gas from the engine 11. Also in this case, the fan 68 having the shutter may be turned on to thereby exhaust the warm air inside the capacitor unit 19 outside the capacitor unit 19 to perform normal cooling. In this, the fan 68 having the shutter mechanism and the blower mechanism is exemplified. However, if the exhausted heat from the turning electric motor smoothly flows into the capacitor unit 19, the blower mechanism is not always necessary.

Figure 11:
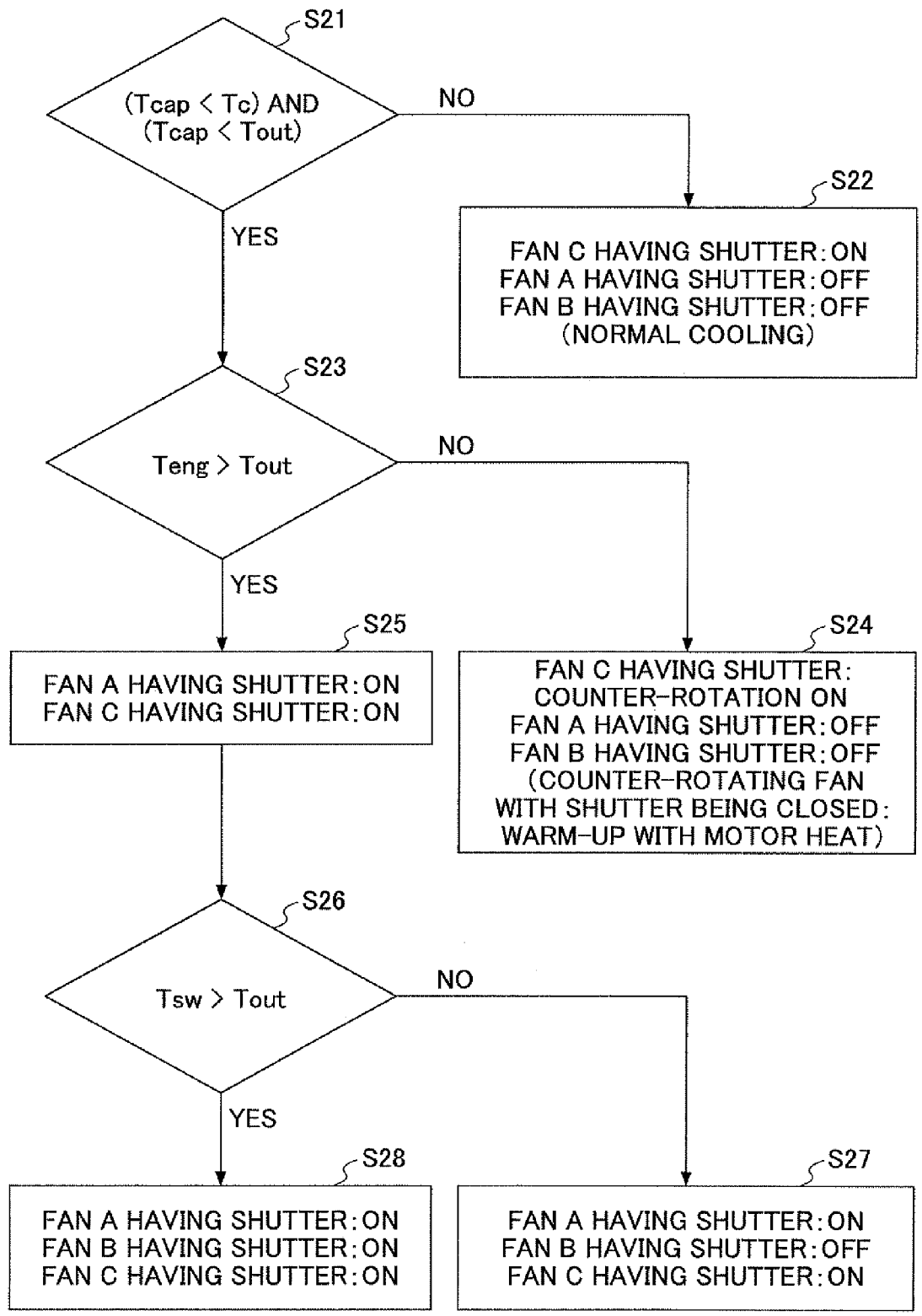
FIG. 11 is a control flowchart of a cooling fan of a capacitor unit while the battery is being warmed up.

Next, control of the fan 68 having the shutter is described. FIG. 11 is a control flowchart of the cooling fan of the capacitor unit while the battery is being warmed up.

In step S21, it is determined whether the capacitor temperature Tcap is lower than a predetermined temperature C (hereinafter, referred to as a warm-up temperature Tc) and whether the capacitor temperature Tcap is lower than an outside air temperature Tout. The warm-up temperature Tc is a threshold temperature for determining whether the capacitor unit 19 is warmed up. The warm-up temperature Tc is previously determined based, on the internal resistance of the capacitor and a practically acceptable charging and discharging current in a similar manner to the warm-up temperature Ta. Said differently, if the capacitor temperature Tcap is lower than the warm-up temperature Tc, it is determined that the warm-up operation should be carried out. Further, by comparing the capacitor temperature Tcap with the outside air temperature Tout, it is determined whether the capacitor unit 19 can be cooled by the outside air. Said differently, if the capacitor temperature Tcap is higher than the outside air temperature Tout, it is determined that the capacitor unit 19 can be cooled by supplying the outside air to the capacitor unit 19.

In step S21, if it is determined that the condition in which the capacitor temperature Tcap is lower than the warm-up temperature Tc (Tcap<Tc) and the capacitor temperature Tcap is lower than the outside air temperature Tout (Tcap<Tout) do not exist, the process goes to step S22. In step S22, the fan 68 having the shutter of the capacitor unit 19 (fan C having the shutter) is turned on and driven, and at the same time, the fan 62 having the shutter (fan A having the shutter) provided in the exhaust path 60 is turned off and the fan 66 having the shutter (fan B having the shutter) provided in the heat rejection path 64 is turned off. With this, by turning on the fan 68 having the shutter, the shutter is opened and the fan is driven to exhaust the warm air inside the capacitor unit 19 toward the outside of the capacitor unit 19. The warm air is exhausted from an air intake port of the capacitor unit 19. Therefore, the capacitor unit 19 is cooled by the outside air. This state is a normal battery cooling with the fan 68 having the shutter.

On the other hand, if it is determined in step S21 that the capacitor temperature Tcap is lower than the warm-up temperature Tc (Tcap<Tc) and the capacitor temperature Tcap is lower than the outside air temperature Tout (Tcap<Tout), the process goes to step S23. If it is determined that the capacitor temperature Tcap is lower than the warm-up temperature Tc (Tcap<Tc) and the capacitor temperature Tcap is lower than the outside air temperature Tout (Tcap<Tout), the warm-up of the capacitor unit 19 becomes necessary. Then, it is determined in step S23 whether the engine temperature Teng is higher than the outside air temperature Tout.

If it is determined in step S23 that the engine temperature Teng is not higher than the outside air temperature Tout, the process goes to step S24. If it is determined that the engine temperature Teng is not higher than the outside air temperature Tout, said differently the engine temperature Teng is the outside air temperature or less, it is not preferable to warm the capacitor unit with the exhaust gas from the engine 11. In step S24, the fan 68 having the shutter provided in the capacitor unit 19 is reverse-rotated and simultaneously the fans 62 and 66 having the shutters provided in the exhaust path 60 and the heat ejection path 64 respectively is turned off. By reverse-rotating the fan 68 having the shutter, the heat generated by a motor operation of the fan 68 is supplied into the capacitor unit 19. Said differently, the capacitor unit 19 is warmed up by the heat generated by the motor of the fan 68 having the shutter.

On the other hand, if it is determined in step S23 that the engine temperature Teng is higher than the outside air temperature Tout, the process goes to step S25. In a case where the engine temperature Teng is higher than the outside air temperature Tout, the capacitor unit 19 is warmed up by the exhaust gas of the engine 11. In step S25, the fan 68 having the shutter is turned on to open the shutter and rotate the fan 68 and simultaneously the fan 62 having the shutter provided in the exhaust path 60 is turned on. With this, the exhaust gas from the engine 11 is supplied to the capacitor unit 19 via the exhaust path 60 and the capacitor unit 19 is warmed up by the exhausted heat from the engine 11.

Subsequently, the process goes to step S26 to determine whether the turning electric motor temperature Tsw is higher than the outside air temperature Tout.

If it is determined in step S26 that the turning electric motor temperature Tsw is not higher than the outside air temperature Tout, the process goes to step S27. If it is determined that the turning electric motor temperature Tsw is not higher than the outside air temperature Tout, said differently, the turning electric motor temperature Tsw is the outside air temperature Tout or less, it is not preferable to warm the capacitor unit 19 with the air. Therefore, in step S27, the fan 68 having the shutter provided in the capacitor unit 19 is turned on, the fan 62 having the shutter provided in the exhaust path 60 is turned on, and the fan 66 having the shutter provided in the heat ejection path 64 is turned off. With this, the exhaust gas from the engine 11 is supplied to the capacitor unit 19 via the exhaust path 60 and the capacitor unit 19 is warmed up by the exhausted heat from the engine 11. However, the air from the turning electric motor 21 is not supplied to the capacitor unit 19.

If it is determined in step S26 that the turning electric motor temperature Tsw is higher than the outside air temperature Tout, the process goes to step S28. If it is determined that the turning electric motor temperature Tsw is higher than the outside air temperature Tout, the capacitor unit 19 is warmed up by the air from the turning electric motor 21. Therefore, in step S28, the fan 68 having the shutter provided in the capacitor unit 19 is turned on, the fan 62 having the shutter provided in the exhaust path 60 is turned on, and the fan 66 having the shutter provided in the heat ejection path 64 is also turned on. With this the exhaust gas from the engine 11 is supplied to the capacitor unit 19 via the exhaust path 60, and the air from the turning electric motor 21 is supplied to the capacitor unit 19 via the heat ejection path 64. Then, the capacitor unit 19 is warmed up by the heated exhaust gas from the engine 11 and the heated air generated by the turning electric motor.

With the battery warm-up process described above, without providing the heating device for warming up the battery (capacitor unit) 19, the battery 19 can be efficiently and quickly warmed up using the exhausted heat and the heat generated by the turning electric motor 21. Although the battery warm-up process is carried out at a time of starting to drive the hybrid-type construction machine, it is possible to constantly carry out the battery warm-up process while the hybrid-type construction machine is being driven. For example, the battery warm-up process may be constantly carried out when the temperature cannot be maintained by using the internal heat generated by the battery.

Although the heat generated from the turning electric motor 21 as the electrical load is used in the other embodiment described above, the present invention is not limited to this. As long as the electrical load generates heat while the electrical load is driven, the electrical load is not limited to the turning electric motor 21.

Although the shutters of the fans 62, 66 and 68 constitute the shutter mechanism in the other embodiment, it is possible to provide the fans and shutters separately. The fans 62 and 66 having the shutters are provided in the exhaust path 60 and the heat ejection path 64, respectively. By operating the fan 68 having the shutter provided in the capacitor unit 19, it is possible to draw the exhaust gas from the engine and the air from the turning electric motor via the exhaust path 60 and the heat ejection path 64, respectively, by the fan 68 having the shutter provided in the capacitor unit 19. It is sufficient to provide the battery warm-up system with the exhaust path 60, the ejection path 64, and shutter mechanisms provided in these paths.

Although the hybrid-type construction machine of the parallel type is exemplified in the embodiments, the warm-up methods of the embodiments are applicable to a hybrid-type construction machine of a so-called series type.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2009-001774 filed on Jan. 7, 2009 and Japanese Patent Application No. 2008-306732 filed on Dec. 1, 2008, the entire contents of which are incorporated herein by reference.

INDUSTRIAL APPLICABILITY

The present invention is applicable to a hybrid-type construction machine.

EXPLANATION OF REFERENCE SYMBOLS 1 lower-part traveling body
1A, 1B traveling mechanism
2 turning mechanism
3 Upper-part turning body
4 boom
5 arm
6 bucket
7 boom cylinder
8 arm cylinder
9 bucket cylinder
10 cabin
11 engine
12 motor generator
13 transmission
14 main pump
15 pilot pump
16 high-pressure hydraulic line
17 control valve
18 inverter
19 battery (capacitor unit)
20 inverter
21 turning electric motor
23 mechanical brake
25 pilot line
26 operation apparatus
26A, 268 lever
26C pedal
27 hydraulic line
28 hydraulic line
29 pressure sensor
30 controller
32 engine control unit
40 drive control unit
54 hydraulic load
56 electrical load
60 exhaust path
62 fan A having shutter
63 exhaust gas temperature sensor
64 heat ejection path
66 fan B having shutter
67 temperature sensor
68 fan C having shutter
69 temperature sensor
70 temperature controller 100 voltage up-down converter
111 DC bus voltage detection part
112 battery voltage detection part
113 battery current detection part
110 DC bus
120 electric power accumulation system

The invention claimed is:

1. A warm-up method for a hybrid-type construction machine, comprising:
    driving an engine by turning on an ignition key of the engine; and
    heating an electric power accumulator by driving the engine if a temperature of the electric power accumulator is lower than a predetermined temperature,
    wherein if the temperature of the electric power accumulator is lower than the predetermined temperature, the engine is driven to carry out a warm-up operation, and simultaneously a motor generator is driven to repeatedly charge or discharge the electric power accumulator to cause the electric power accumulator to generate heat,
    the motor generator is driven by the engine to charge the electric power accumulator through an inverter, a DC bus, and a voltage up-down converter, and
    the motor generator is driven to discharge the electric power accumulator through the inverter, the DC bus, and the voltage up-down converter by assisting the engine to activate a pump.

2. The warm-up method for the hybrid-type construction machine according to claim 1,
    wherein the electric power accumulator is charged or discharged by changing a target state of charge of the electric power accumulator.

3. The warm-up method for the hybrid-type construction machine according to claim 2,
    wherein when the electric power accumulator is discharged the target state of charge is set to be a low value, and
    when the electric power accumulator is charged the target state of charge is set to be a high value.

4. The warm-up method for the hybrid-type construction machine according to claim 1,
    wherein the electric power accumulator is charged or discharged by changing a power required by an electrical load.

5. The warm-up method for the hybrid-type construction machine according to claim 1,
    wherein if the temperature of the electric power accumulator is lower than the predetermined temperature, a rotational speed of the engine when the engine is started is set higher than a rotational speed of the engine after the electric power accumulator is warmed up.

6. A hybrid-type construction machine warmed up by a warm-up method of driving an engine by turning on an ignition key of the engine and heating an electric power accumulator by driving the engine if a temperature of the electric power accumulator is lower than a predetermined temperature, the hybrid-type construction machine comprising:
    the engine assisted by a motor generator;
    the electric power accumulator configured to supply electric power to the motor generator;
    a motor being an electrical load; and
    a path configured to connect at least one of the engine and the motor to the electric power accumulator.

7. The hybrid-type construction machine according to claim 6, further comprising:
    a shutter mechanism configured to open and close the path.

8. The hybrid-type construction machine according to claim 7, further comprising:
    a control unit configured to control the shutter mechanism of the path based on the temperature of the electric power accumulator, an exhaust gas temperature of the engine, and a temperature of air exhausted from the motor.

9. The hybrid-type construction machine according to claim 6, further comprising:
    a cooling fan configured to cool the electric power accumulator by exhausting air inside electric power accumulator to an outside.

10. The hybrid-type construction machine according to claim 9, further comprising:
    a control unit configured to control an operation of the cooling fan based on the temperature of the electric power accumulator, an exhaust gas temperature of the engine, and a temperature of air exhausted from the motor.

11. The hybrid-type construction machine according to claim 9,
    wherein the cooling fan has a shutter.

* * * * *